J. H. McQUAID
VINE SUPPORT.
APPLICATION FILED JULY 13, 1920.
1,432,403.    Patented Oct. 17, 1922.
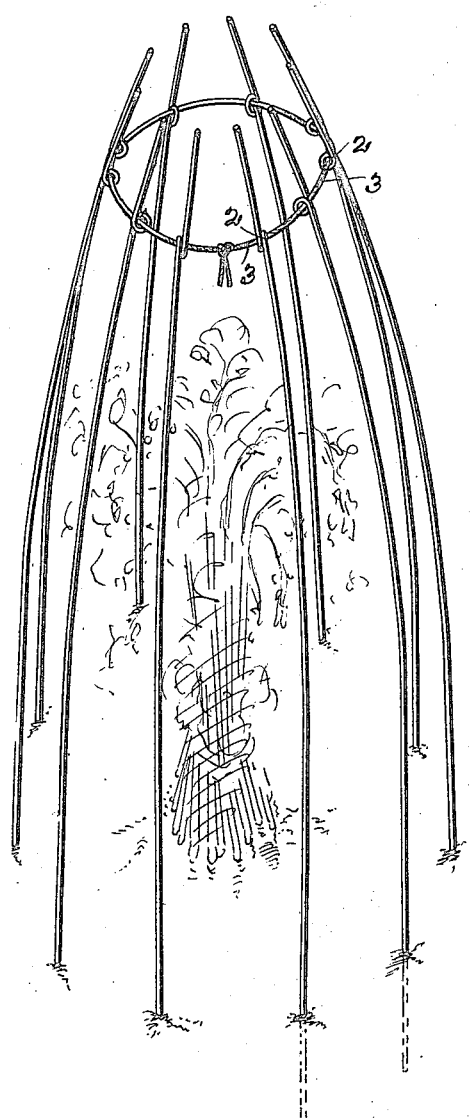
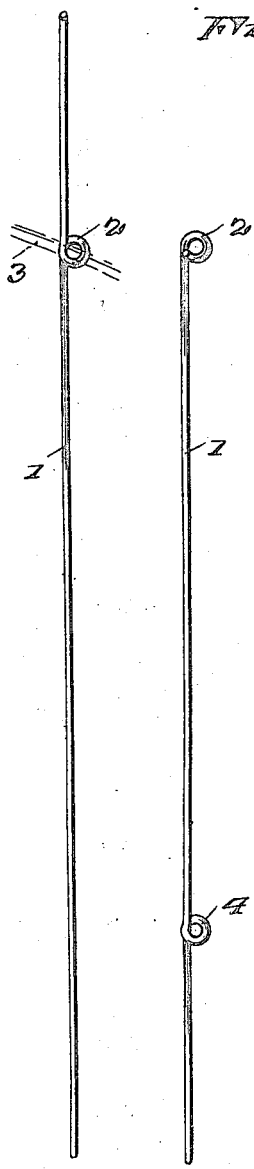
Inventor
John H. McQuaid.
By Lacey & Lacey, Attorneys Patented Oct. 17, 1922.

1,432,403

UNITED STATES PATENT OFFICE.

JOHN H. McQUAID, OF BERMONT, FLORIDA.

VINE SUPPORT.

Application filed July 13, 1920. Serial No. 395,953.

*To all whom it may concern:*

Be it known that I, JOHN H. McQUAID, a citizen of the United States, residing at Bermont, in the county of De Sota and State of Florida, have invented certain new and useful Improvements in Vine Supports, of which the following is a specification.

This invention has for its object the provision of a simple and cheap device by the use of which vines and other climbing plants may be supported so that they will be strengthened and the yield increased. The invention is illustrated in the accompanying drawings and consists in certain novel features which will be hereinafter first fully described and then more particularly pointed out in the appended claims.

In the drawings—

Figure 1 is a perspective view showing my device arranged for use;

Fig. 2 is an elevation showing one form of support;

Fig. 3 is a similar view showing another form of support.

In carrying out my invention, I provide light metallic rods or stout wires which may be of any desired length and which, as shown at 1, will be straight throughout nearly their entire extent. Near or at one end, the rod or wire is doubled upon itself to form an eye or loop 2 through which a cord or other flexible fastening 3 may be inserted when it is desired to draw a number of the supports together.

In actual practice, a number of the wires or supports will be driven into the ground, as shown in Fig. 1, in an approximately circular arrangement with the several eyes or loops 2 in about the same horizontal plane, after which the cord or flexible fastening 3 is threaded through all the eyes and its ends tied or otherwise secured. The several supports will thus form a conical frame and will definite approximately a circular area within which a vine or a plurality of vines may be planted. The supports will, therefore, serve as guards to prevent trampling upon the vines and if the vines be planted at the proper distance from the inner surfaces of the several rods or wires they may be readily trained to run up the wires so as to be firmly supported and strengthened and consequently permit an increased yield. The device will be found particularly advantageous in training beans, peas or similar vines and when the edible products are to be gathered, the vines may be cut close to the roots and the entire support withdrawn from the ground and placed in a barn or other convenient place to be subsequently stripped.

When the surface of the ground is level or nearly level, it may be desirable to provide means which will insure the several supporting members being inserted in the ground to the same depth and to this end I bend or double the wire upon itself near the lower end to form a second eye 4, as shown in Fig. 3. This eye will constitute a stop or abutment which by contact with the surface of the ground will limit the depth to which the wire may be driven. By having the supports all of the same length uniformity in the appearance of the field is attained and, furthermore, the several vines in one hill or group will be given the same support at their upper ends and uniformity of growth and development promoted. In this form of the invention, the eye 2 is at the upper extremity of the rod which is better adapted for use on lawns to form arbors over which flowering vines may be trained.

My device is obviously exceedingly cheap and may be manufactured rapidly and easily. It is capable of storage in large numbers within a small space so that extensive warehouse facilities are not needed and the cost of transportation from point to point is minimized.

Having thus described the invention, what is claimed as new is:

1. A plant support comprising a plurality of flexible standards normally disconnected one from the other throughout the major portions of their lengths, the lower ends of said standards being adapted to be embedded in the ground around a plant and flexible means connected with the upper ends of said standards for drawing said upper ends inwardly from normal position to form a frame over the plant, said flexible means permitting adjustable flexing of said standards.

2. A plant support comprising a plurality of flexible standards normally disconnected one from the other throughout the major portions of their lengths and each provided with an eye near its upper end, and a flexible member extending through said eyes for flexing the upper ends of the standards and drawing them together, whereby the distance between the flexible standards adjacent said eyes may be adjusted by means of said flexible member.

In testimony whereof I affix my signature.

JOHN H. McQUAID. [L. S.]